US011873055B2

(12) United States Patent
An et al.

(10) Patent No.: US 11,873,055 B2
(45) Date of Patent: Jan. 16, 2024

(54) PERSONAL MOBILITY, LOADING APPARATUS FOR PERSONAL MOBILITY, AND LOADING METHOD OF PERSONAL MOBILITY

(71) Applicants: Hyundai Motor Company, Seoul (KR); Kia Corporation, Seoul (KR)

(72) Inventors: Rowoon An, Seoul (KR); Ilsun Song, Seongnam-si (KR); Jae Yul Woo, Seoul (KR); Seunghyun Woo, Seoul (KR); Soobin Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 252 days.

(21) Appl. No.: 17/463,946

(22) Filed: Sep. 1, 2021

(65) Prior Publication Data

US 2022/0161887 A1 May 26, 2022

(30) Foreign Application Priority Data

Nov. 23, 2020 (KR) .................. 10-2020-0158158

(51) Int. Cl.
*B62K 15/00* (2006.01)
*B62K 11/02* (2006.01)
*B62K 21/16* (2006.01)
*B62H 3/00* (2006.01)
*B62K 11/14* (2006.01)
*B62M 7/12* (2006.01)

(52) U.S. Cl.
CPC ............. *B62K 15/00* (2013.01); *B62H 3/00* (2013.01); *B62K 11/02* (2013.01); *B62K 11/14* (2013.01); *B62K 21/16* (2013.01); *B62M 7/12* (2013.01); *B62K 2204/00* (2013.01)

(58) Field of Classification Search
CPC ........ B62K 15/00; B62K 11/02; B62K 11/14; B62K 21/16; B62K 21/18; B62H 3/00
See application file for complete search history.

(56) References Cited

U.S. PATENT DOCUMENTS

| 5,097,922 | A | * | 3/1992 | Stagi | B62K 15/006 |
| | | | | | 280/37 |
| 6,273,442 | B1 | * | 8/2001 | Fallon | B62K 15/008 |
| | | | | | 280/30 |
| 9,629,430 | B1 | * | 4/2017 | Getahun | A45C 5/03 |
| 9,896,148 | B2 | * | 2/2018 | Baba | B62K 19/02 |
| 11,124,257 | B2 | * | 9/2021 | Kuo | B62J 50/10 |
| 2003/0080535 | A1 | * | 5/2003 | Kurohori | B62H 3/00 |
| | | | | | 280/638 |
| 2004/0094919 | A1 | * | 5/2004 | Roder | A45C 9/00 |
| | | | | | 280/30 |

(Continued)

FOREIGN PATENT DOCUMENTS

| CN | 106976516 A | * | 7/2017 | |
| GB | 2453796 A | * | 4/2009 | ........... A45C 13/385 |

*Primary Examiner* — Minnah L Seoh
*Assistant Examiner* — Hosam Shabara
(74) *Attorney, Agent, or Firm* — Slater Matsil, LLP

(57) ABSTRACT

An embodiment personal mobility includes a main body provided in a box shape, a steering device comprising a steering handle configured to extend outwardly from the main body or to retract so as not to protrude from the main body, and a front wheel and a rear wheel installed on a front side and a rear side of the main body, respectively.

21 Claims, 13 Drawing Sheets

(56) References Cited

U.S. PATENT DOCUMENTS

| | | | |
|---|---|---|---|
| 2013/0001911 A1* | 1/2013 | Porri | A45C 9/00 280/87.042 |
| 2013/0048401 A1* | 2/2013 | Kim | B62J 43/28 280/638 |
| 2023/0074978 A1* | 3/2023 | Kim | B62K 21/24 |

* cited by examiner

PERSONAL MOBILITY, LOADING APPARATUS FOR PERSONAL MOBILITY, AND LOADING METHOD OF PERSONAL MOBILITY

CROSS-REFERENCE TO RELATED APPLICATIONS

This application claims the benefit of Korean Patent Application No. 10-2020-0158158, filed on Nov. 23, 2020, which application is hereby incorporated herein by reference.

TECHNICAL FIELD

The disclosure relates to a personal mobility, a loading apparatus for the personal mobility, and a loading method of the personal mobility.

BACKGROUND

Recently, a sharing service using a personal mobility, such as an electric bicycle and an electric scooter, has been developed. This is because when it is too close to travel by a vehicle but difficult to travel by walking, a user may travel conveniently without difficulty by using an electric bicycle or the like.

A company that provides a personal mobility sharing service is required to collect and recharge a personal mobility returned after use, and to relocate the personal mobility to areas in demand. The collection and relocation work is carried out by loading and transporting the personal mobility onto a cargo truck.

However, the personal mobility such as a typical electric bicycle and electric kickboard is difficult to be collected and relocated because loading efficiency is poor due to a feature of an appearance thereof. In addition, when a load is indiscriminately loaded or stored in the personal mobility, the load is liable to be damaged.

SUMMARY

The disclosure relates to a personal mobility, a loading apparatus for the personal mobility, and a loading method of the personal mobility. Particular embodiments relate to a personal mobility capable of easily loading and transporting a load and safely storing the load, a loading apparatus for the personal mobility, and a loading method of the personal mobility.

An embodiment of the disclosure provides a personal mobility capable of easily loading and transporting a load and safely storing the load, a loading apparatus for the personal mobility, and a loading method of the personal mobility.

Additional embodiments of the disclosure will be set forth in part in the description which follows and, in part, will be obvious from the description, or may be learned by practice of the disclosure.

In accordance with an embodiment of the disclosure, a personal mobility includes a main body provided in a box shape, a steering device including a steering handle provided to extend outwardly from the main body or to retract not to protrude from the main body, and a front wheel and a rear wheel installed on a front side and a rear side of the main body, respectively.

The main body may be provided in a rectangular parallelepiped shape having a height in an up-down direction smaller than a length in a front-rear direction and a width in a lateral direction smaller than the height in the up-down direction.

The main body may include a front wheel receiving portion provided on a front lower edge to accommodate a portion of the front wheel, and a rear wheel receiving portion provided on a rear lower edge to accommodate a portion of the rear wheel.

The main body may include wheel receiving grooves provided on a front upper side and a rear upper side to support front and rear wheels of other personal mobilities loaded on an upper side, respectively.

The main body may include one or more coupling holes provided to penetrate in a direction of crossing a traveling direction so that coupling bars of a loading apparatus are mounted therein.

The main body may be provided such that a width of a front end and a width of a rear end are the same.

The steering device may include a telescopic steering shaft installed on an upper portion of the main body, having an upper end connected to the steering handle, and configured to be operated to extend upward from the main body or retract into the inside of the main body, a telescopic driving device installed in the main body to extend and retract the steering shaft, and a power transmission device configured to transmit the rotation of the steering shaft to the front wheel.

The steering handle may include a handle bar fixed to an upper portion of the steering shaft and having a length corresponding to a width of the main body or smaller than the width of the main body, left and right handles installed on opposite sides of the handle bar, respectively, to protrude from opposite ends of the handle bar in a longitudinal direction or to enter the inside of the handle bar, and one or more handle driving devices provided in the handle bar to operate the left handle and the right handle.

The main body may include a front wheel receiving portion provided on a front lower edge to accommodate the front wheel therein, and a rear wheel receiving portion provided on a rear lower edge to accommodate the rear wheel therein.

The personal mobility may further include a front wheel support device installed in the front wheel receiving portion to movably support the front wheel to the inside or outside of the front wheel receiving portion, and a rear wheel support device installed in the rear wheel receiving portion to movably support the rear wheel to the inside or outside of the rear wheel receiving portion.

The front wheel support device may include a front wheel support member provided to support a shaft of the front wheel and including a first support shaft connected to the steering device, a shaft support member provided to rotatably support the first support shaft, a second support shaft extending from opposite sides of the shaft support member in a width direction of the main body to be rotatably supported on the main body, and a front transfer driving device configured to rotate the second support shaft in a forward or backward direction.

The front transfer driving device may include a front transfer motor fixed to the main body, and a worm gear assembly provided to transmit the rotation of the front transfer motor to the second support shaft.

The rear wheel support device may include a rear wheel support member provided to support a shaft of the rear wheel, a rear support shaft extending from opposite sides of the rear wheel support member in a width direction of the main body to be rotatably supported on the main body, and a rear transfer driving device configured to rotate the rear support shaft in a forward or backward direction.

The rear transfer driving device may include a rear transfer motor fixed to the main body, and a worm gear assembly provided to transmit the rotation of the rear transfer motor to the rear support shaft.

In accordance with an embodiment of the disclosure, a loading apparatus for a personal mobility which includes a main body provided in a box shape, a steering handle capable of being folded to enter the inside of the main body, and a front wheel and a rear wheel respectively installed on a front side and a rear side of the main body, includes a loading rack having a width corresponding to a width of the main body of the personal mobility and having a plurality of loading spaces capable of loading continuously a plurality of the personal mobilities in an up-down direction or a front-rear direction, and a plurality of coupling bars installed to penetrate the main bodies of the plurality of personal mobilities loaded in the plurality of loading spaces and the loading rack in a lateral direction.

The loading rack may include a plurality of partition walls provided to partition the inside of the loading rack into the plurality of loading spaces.

The plurality of coupling bars may be coupled to penetrate coupling holes formed in the main bodies of the plurality of personal mobilities and support holes formed on the plurality of partition walls to correspond to the coupling holes.

The plurality of partition walls may include one or more support rails protruding from sides thereof and extending long in the front-rear direction to support the plurality of personal mobilities loaded in upper regions of the plurality of loading spaces.

In accordance with an embodiment of the disclosure, a loading method of a personal mobility, which includes a main body provided in a box shape, a steering handle capable of protruding to the outside from the main body or entering the inside of the main body, and a front wheel and a rear wheel respectively installed on a front side and a rear side of the main body, includes entering the steering handle into the inside of the main body and then continuously loading a plurality of the personal mobilities in a loading rack having a plurality of loading spaces having a width corresponding to a width of the main body in an up-down direction or a front-rear direction.

The loading method may further include installing one or more coupling bars to penetrate the main bodies of the plurality of personal mobilities loaded in the plurality of loading spaces and the loading rack in a lateral direction.

When the plurality of personal mobilities is loaded in the up-down direction, the front and rear wheels of the personal mobility located at an upper side may be supported on wheel receiving grooves provided on an upper portion of the main body of the personal mobility located at a lower side.

In accordance with an embodiment of the disclosure, a loading method of a personal mobility, which includes a main body provided in a box shape, a steering handle capable of protruding to the outside from the main body or entering the inside of the main body, and a front wheel and a rear wheel respectively installed on a front side and a rear side of the main body and capable of protruding to the outside from the main body or entering the inside of the main body, includes entering the steering handle and the front and rear wheels into the inside of the main body and then continuously loading a plurality of the personal mobilities in a loading rack having a plurality of loading spaces having a width corresponding to a width of the main body in an up-down direction or a front-rear direction.

BRIEF DESCRIPTION OF THE DRAWINGS

These and/or other embodiments of the disclosure will become apparent and more readily appreciated from the following description of the embodiments, taken in conjunction with the accompanying drawings, in which.

DETAILED DESCRIPTION OF ILLUSTRATIVE EMBODIMENTS

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain embodiments of the disclosure, parts not related to the description are omitted from the drawings, and the width, length, thickness, etc. of the components may be exaggerated for convenience.

Figure 1:
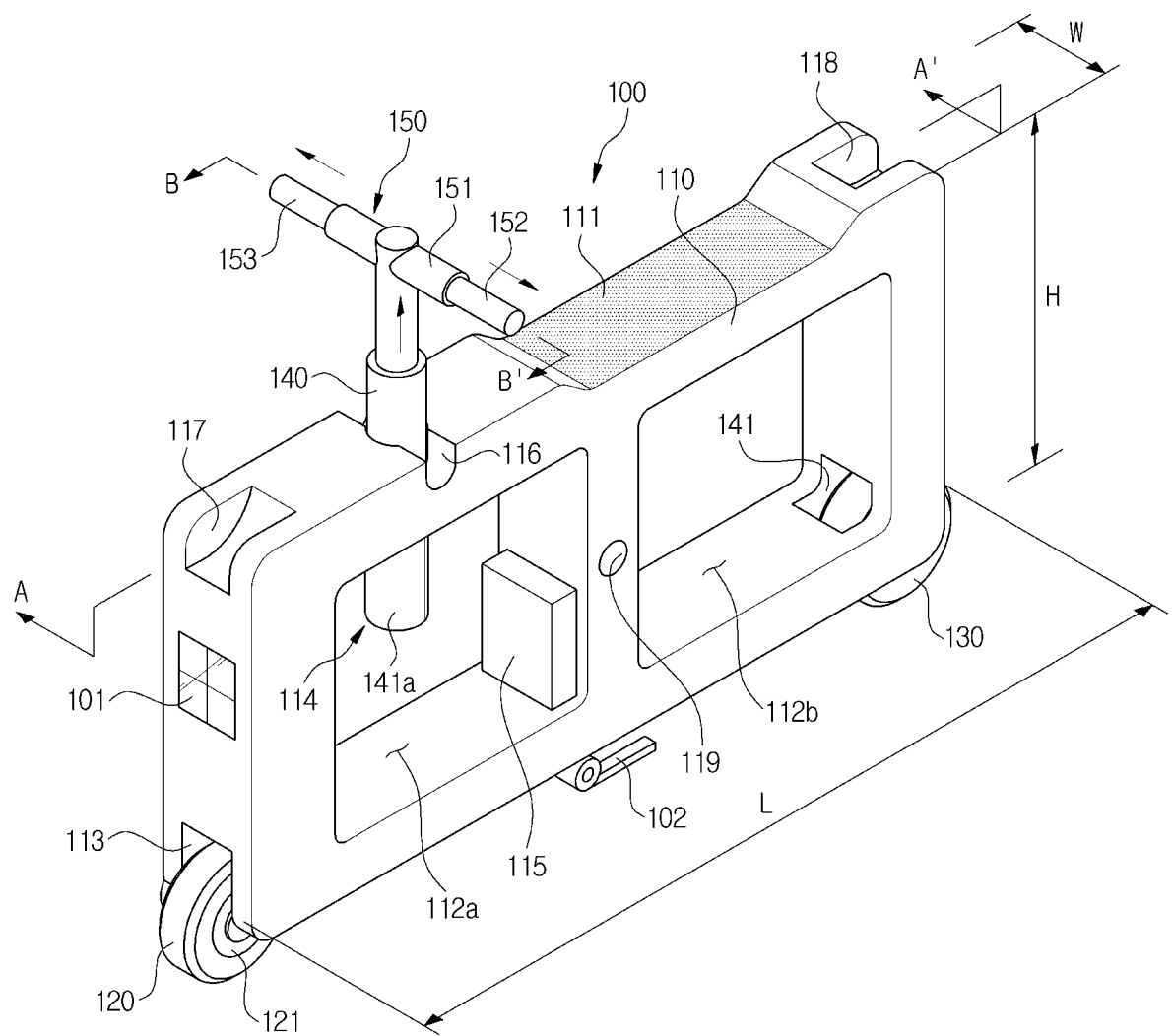
FIG. 1 is a perspective view of a personal mobility according to a first embodiment of the disclosure.
Figure 2:
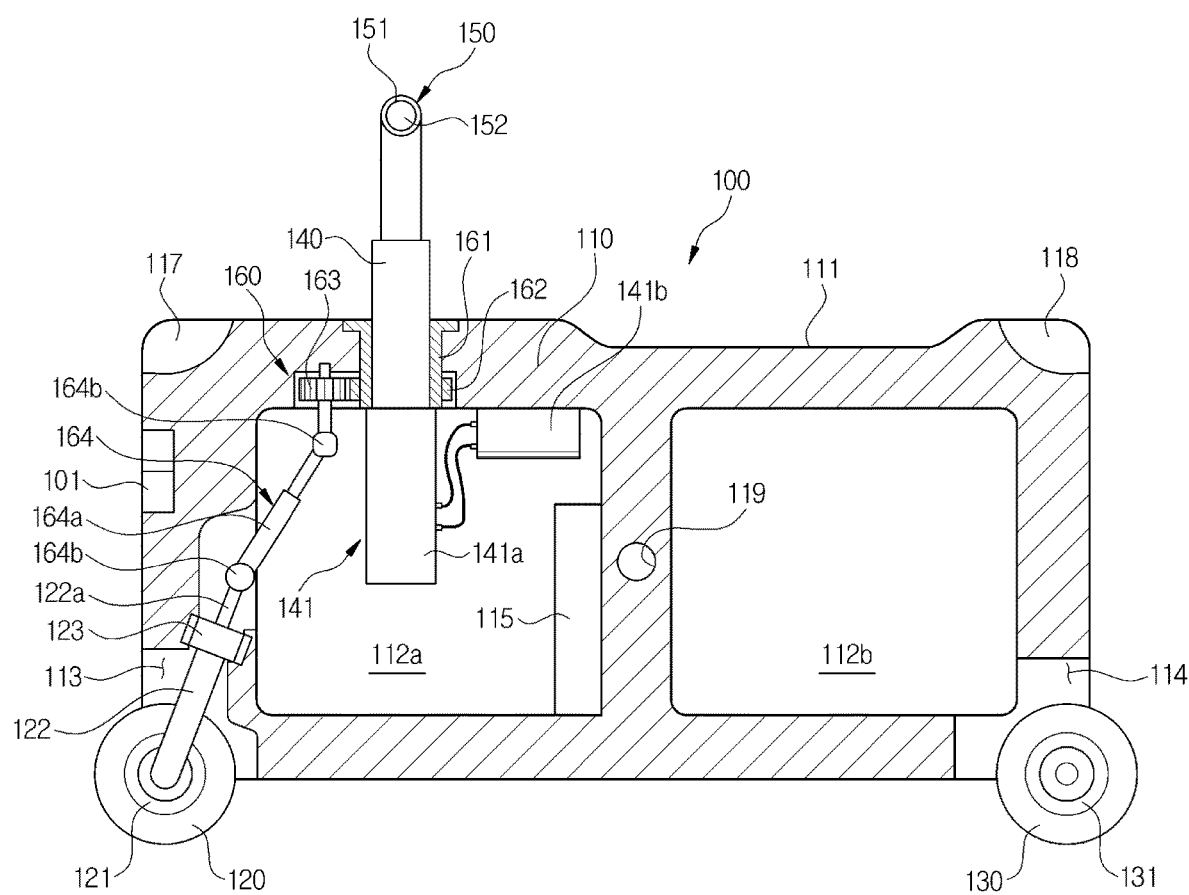
FIG. 2 is a cross-sectional view taken along line A-A' in FIG. 1.
Figure 3:
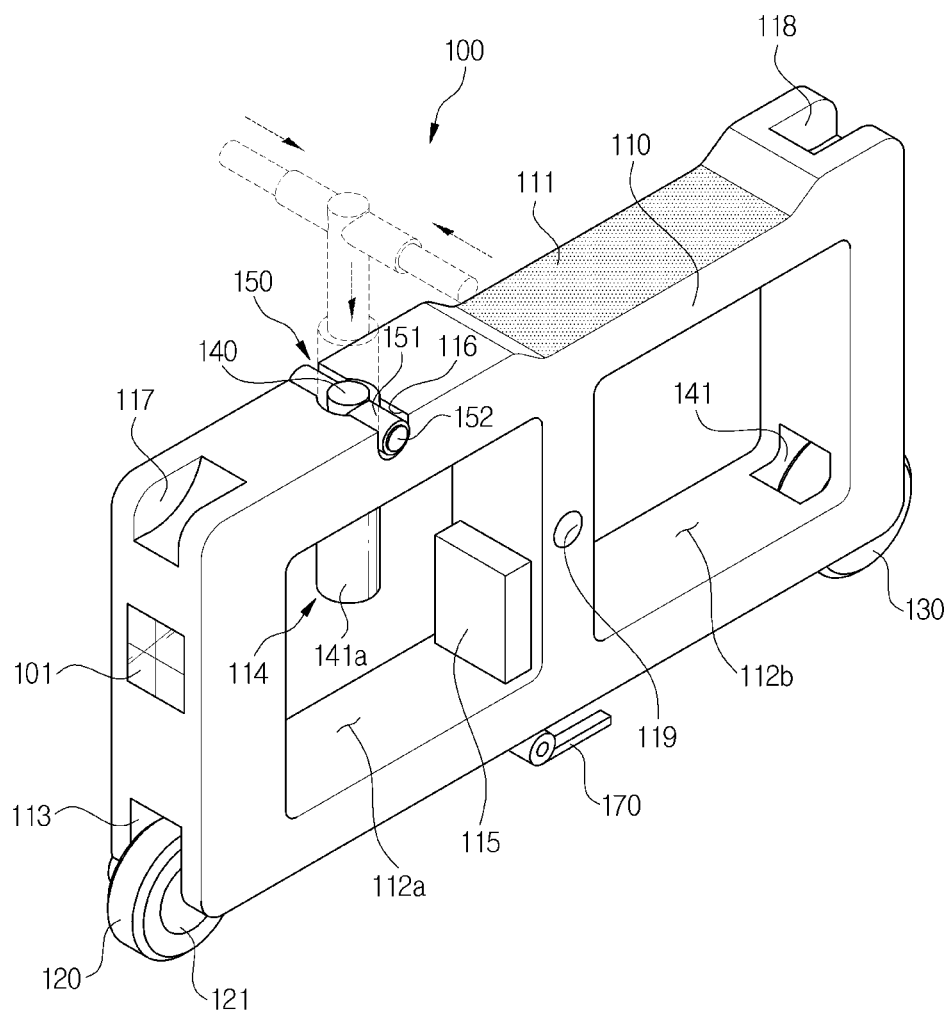
FIG. 3 is a perspective view of the personal mobility according to the first embodiment of the disclosure, illustrating a state in which a steering handle is folded.

Referring to FIGS. 1 to 3, a personal mobility 100 according to a first embodiment of the disclosure may include a main body no, a front wheel 120, a rear wheel 130, a steering device, a kickstand 102, and a head lamp 101.

The main body no may be provided in the form of a square box to facilitate loading, transportation, storage, and the like. The main body no may be provided in the form of a rectangular parallelepiped box having a height H in an up-down direction smaller than a length L in a front-rear direction and a width W in a lateral direction smaller than the height H in the up-down direction. The main body no may be provided such that a width of a front end thereof and a width of a rear end thereof are the same. The main body no may be provided such that opposite sides thereof are substantially parallel and a front surface and a rear surface thereof are substantially parallel. A seat in for boarding a user may be provided on an upper surface of the main body no.

The main body no may be made of a material that is lighter than metal and has excellent rigidity. For example, the main body no may be formed of an engineering plastic material such as polycarbonate (PC), modified polyphenylene oxide (mPPO), nylon (Nylon), polyacetal (Acetal or POM), and polybutylene terephthalate (PBT). The main body no may be formed of a resin molded product in which a metal frame is inserted, or may be provided in a form in which a metal frame, a metal panel, or a resin panel is combined.

The main body no may include spaces 112a and 112b penetrating the left and right sides to reduce weight, and although not shown in the drawing, may include covers covering the opposite sides, respectively.

The head lamp 101 may be installed on the front surface of the main body no, and a kickstand 102 for parking may be provided below the main body 110.

The front wheel 120 may be installed at a front lower edge of the main body 110, and the rear wheel 130 may be installed at a rear lower edge of the main body no. As illustrated in FIG. 2, the main body no may include a front wheel receiving portion 113 provided at the front lower edge to accommodate a part of the front wheel 120, and a rear wheel receiving portion 114 at the rear lower edge to accommodate a part of the rear wheel 130. At least one of the front wheel 120 and the rear wheel 130 may be provided with wheel drive motors 121 and 131 for driving, and a battery 115 for providing energy to the wheel drive motors 121 and 131 may be installed in the main body 110.

As illustrated in FIG. 2, the front wheel 120 is supported by a front wheel support member 122 having a fork shape, and the front wheel support member 122 is provided such that an upper support shaft 122a is rotatably supported by a shaft support member 123 installed in the main body no. Accordingly, the front wheel 120 may be steered by the rotation of the front wheel support member 122.

The steering device may include a steering shaft 140, a telescopic driving device 141, a steering handle 150, and a power transmission device 160.

The steering shaft 140 is installed in a front upper portion of the main body 110 and may be configured as a telescopic type extending upward from or retracting into the main body 110.

The telescopic driving device 141 is installed below the steering shaft 140 in the main body 110 and may extend and retract the telescopic steering shaft 140 in the up-down direction. The telescopic driving device 141 may include a hydraulic cylinder 141a to lift the steering shaft 140 and a hydraulic control device 141b to operate the hydraulic cylinder 141a. The present embodiment illustrates the hydraulic telescopic driving device 141 as an example, but the telescopic driving device 141 may be configured as an electric type.

By the operation of the telescopic driving device 141, the steering shaft 140 may extend to protrude to the outside of the main body 110 as in the example of FIG. 1 or may retract into the main body no not to protrude from the main body no as in the example of FIG. 3.

Figure 4:
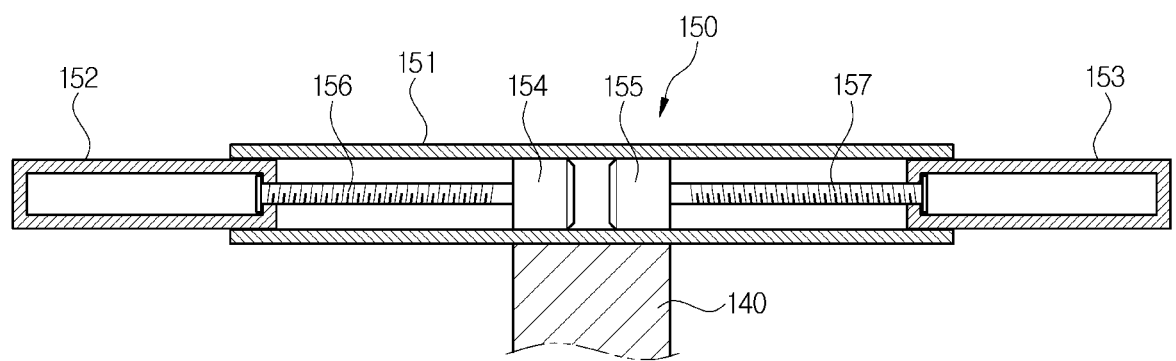
FIG. 4 is a cross-sectional view taken along line B-B' in FIG. 1, illustrating a state in which left and right handles of the steering handle are unfolded.
Figure 5:
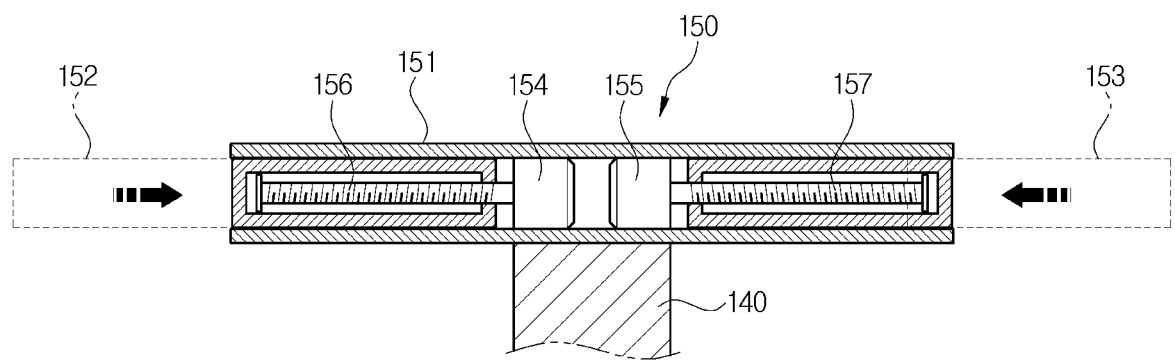
FIG. 5 is a cross-sectional view taken along the line B-B' in FIG. 1, illustrating a state in which the left and right handles of the steering handle are folded.

The steering handle 150 is installed on an upper end of the steering shaft 140, and may be raised and lowered together with the steering shaft 140 by the operation of the steering shaft 140. As illustrated in FIGS. 4 and 5, the steering handle 150 may include a handle bar 151, a left handle 152, a right handle 153, and one or more handle driving devices.

The handle bar 151 may be a hollow tube in which an intermediate portion between opposite ends is fixed to an upper portion of the steering shaft 140. The handle bar 151 may be provided with a length corresponding to a width W of the main body 110 or smaller than the width W of the main body no so that the handle bar 151 may be completely accommodated in a handle receiving groove 116 (refer to FIG. 3) formed on an upper portion of the main body no when lowered.

The left handle 152 and the right handle 153 are slidably installed on opposite sides of the handle bar 151, respectively, to protrude from opposite ends of the handle bar 151 in a longitudinal direction or to enter the inside of the handle bar 151.

As illustrated in FIG. 4, the handle driving device may include a left motor 154 and a right motor 155 installed inside the handle bar 151, a left feed screw 156 fastened to the left handle 152 to rotate in a forward or backward direction by the operation of the left motor 154, and a right feed screw 157 fastened to the right handle 153 to rotate in the forward or backward direction by the operation of the right motor 155. The present embodiment illustrates that the left motor 154 and the right motor 155 are employed for the operation of the left feed screw 156 and the right feed screw 157, respectively, but the left feed screw 156 and the right feed screw 157 may be configured to rotate together by one motor. That is, the handle driving device may be configured as an integral type.

By the operation of the left motor 154 and the right motor 155, the left handle 152 and the right handle 153 of the steering handle 150 protrude and extend to the outside of the handle bar 151, as illustrated in FIG. 4, or enter and retract into the inside of the handle bar 151, as illustrated in FIG. 5. Therefore, as illustrated in FIG. 3, the steering handle 150 may be lowered by the operation of the steering shaft 140 in a state where the left handle 152 and the right handle 153 enter the handle bar 151 and may be completely accommodated in the handle receiving groove 116 formed on the upper portion of the main body no.

Referring to FIG. 2, the power transmission device 160 transmits the rotation of the steering shaft 140 to the support shaft 122a of the front wheel support member 122 so that the steering of the front wheel 120 is performed when the user rotates the steering handle 150.

The power transmission device 160 may include a rotation member 161 installed on the upper portion of the main body no to rotate together with the steering shaft 14o, a driving gear 162 fixed to an outer surface of the rotation member 161 to rotate together with the rotation member 161, a driven gear 163 engaged with the driving gear 162 to be rotated by the operation of the driving gear 162, and a bent connection shaft 164 provided to transmit the rotation of the driven gear 163 to the support shaft 122a. The bent connection shaft 164 may include a serration shaft 164a capable of being stretched and contracted in the longitudinal direction, and a plurality of universal joints 164b capable of being bent.

Figure 6:
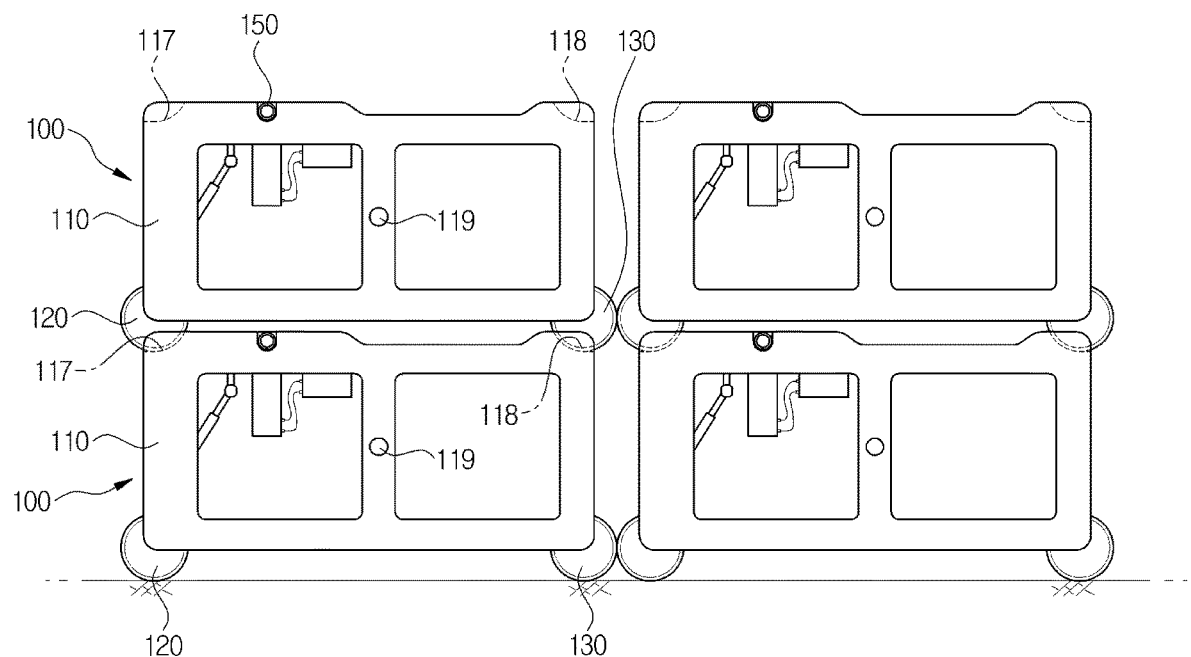
FIG. 6 is a side view illustrating a state in which the personal mobility according to the first embodiment of the disclosure is loaded.

Referring to FIGS. 3 and 6, in the personal mobility 100 of the first embodiment, because the main body 110 is formed in the shape of a square box, a load may be continuously loaded in the up-down or front-rear direction with the steering handle 150 folded. Therefore, it is easy to transport, load and store.

As illustrated in FIG. 3, the main body no may include wheel receiving grooves 117 and 118 respectively provided on a front upper side and a rear upper side to support the front wheel 120 and the rear wheel 130 of other personal mobilities loaded on the upper side thereof. Accordingly, as illustrated in FIG. 6, because the front wheel 120 and the rear wheel 130 of the personal mobility 100 loaded on the upper side are supported in a state of being partially accommodated in the wheel receiving grooves 117 and 118 of the main body no of the lower personal mobility 100, the personal mobility 100 loaded on the upper side may be stably loaded without being pushed in the front-rear direction and the lateral direction.

Figure 7:
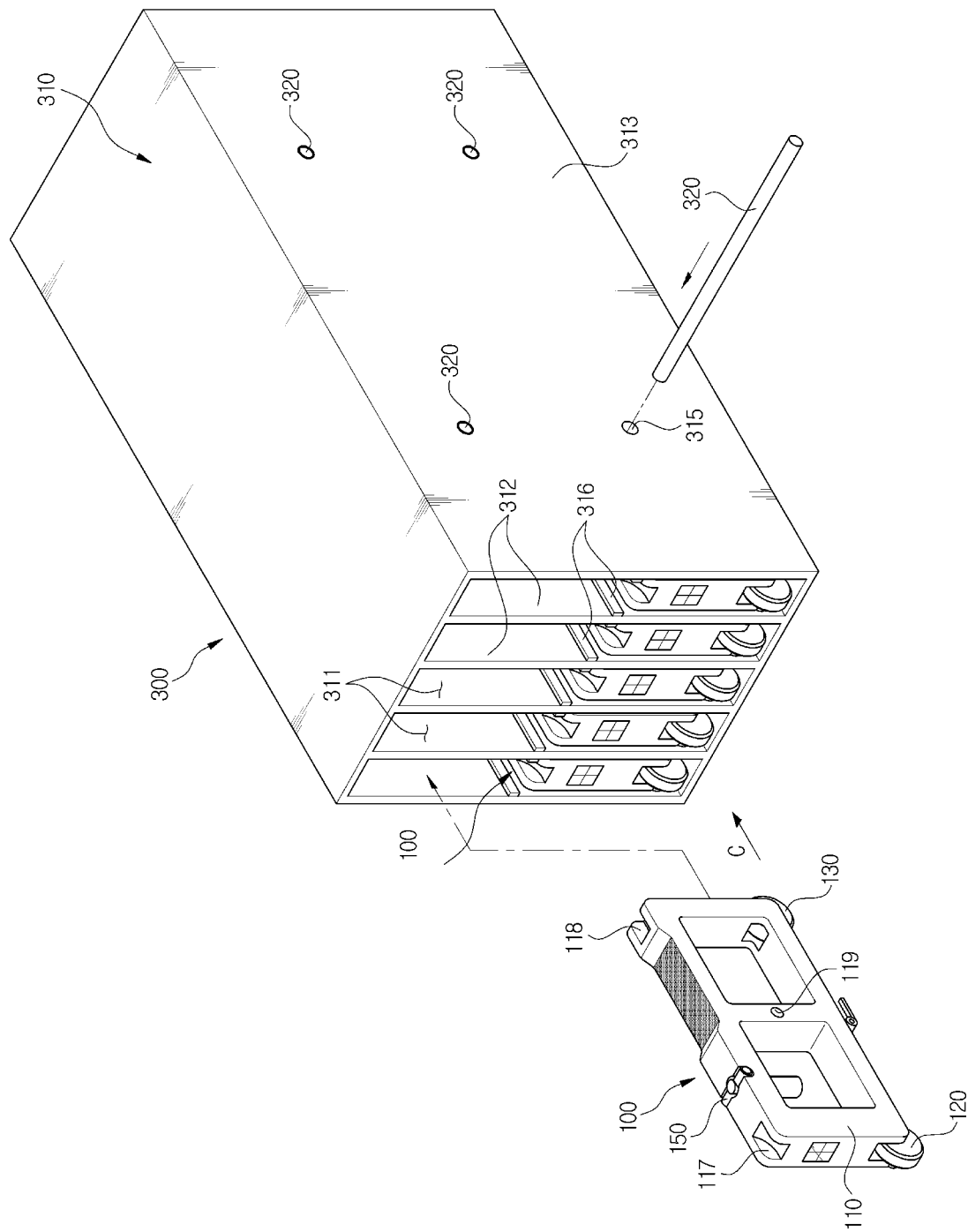
FIG. 7 is a perspective view illustrating a loading apparatus for loading the personal mobility according to the first embodiment of the disclosure.
Figure 8:
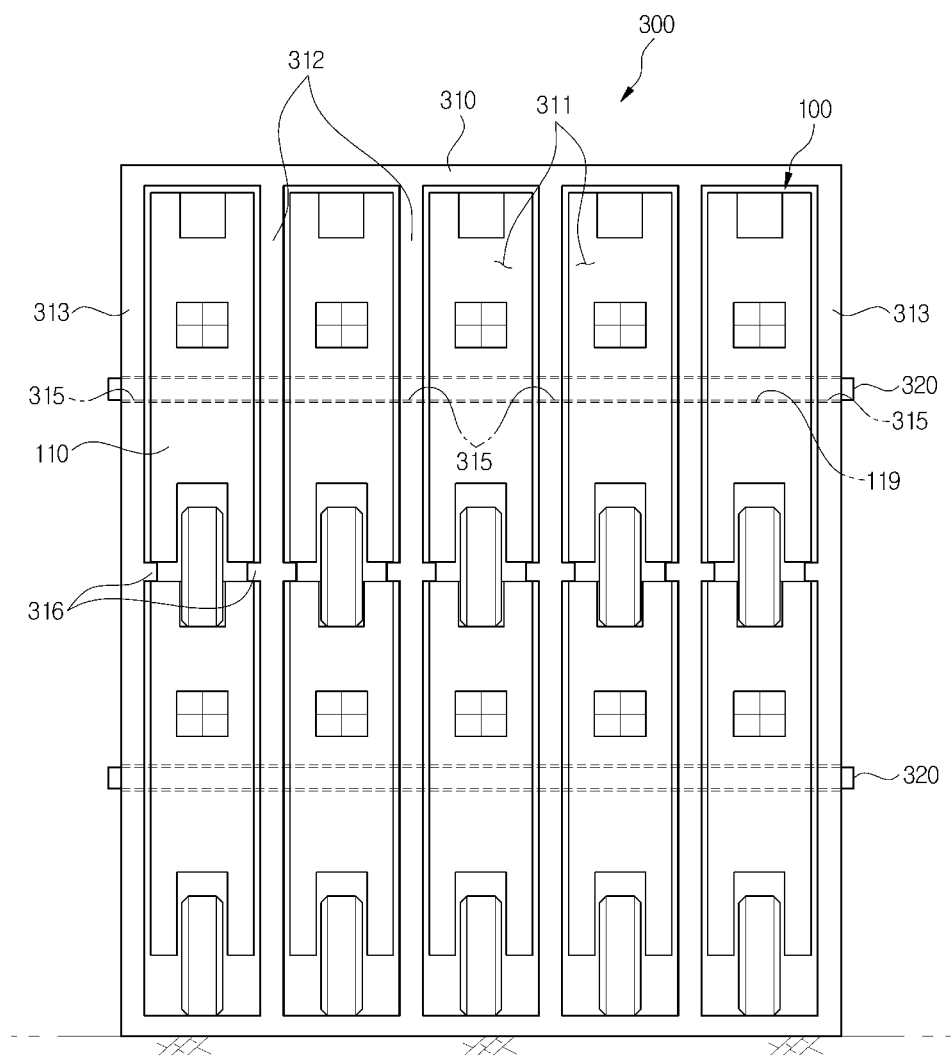
FIG. 8 is a front view of the loading apparatus as seen in the direction of arrow C in FIG. 7.

The main body no may include a coupling hole 119 formed on a substantially central portion in a direction of crossing a traveling direction. As illustrated in FIGS. 7 and 8, the coupling hole 119 may be used for coupling a coupling bar 320 penetrating a loading rack 310 in the lateral direction when the personal mobility 100 is loaded in a loading apparatus 300.

FIGS. 7 and 8 illustrate the loading apparatus 300 capable of loading the personal mobility 100 according to the first embodiment. Referring to FIGS. 7 and 8, the loading apparatus 300 may include the loading rack 310 and a plurality of the coupling bars 320 installed to penetrate the loading rack 310 in the lateral direction.

The loading rack 310 includes a plurality of loading spaces 311 therein. The plurality of loading spaces 311 has a width corresponding to the width W of the main body no of the personal mobility 100, and in the plurality of loading spaces 311, the personal mobility 100 may be continuously stacked in the up-down direction or the front-rear direction.

The plurality of loading spaces 311 is partitioned by a plurality of partition walls 312 installed inside the loading rack 310. The plurality of partition walls 312 may be spaced apart from each other at equal intervals in the lateral direction and may extend in the up-down direction and the front-rear direction.

As illustrated in FIGS. 6 and 8, the plurality of personal mobilities 100 may be continuously loaded in the respective loading spaces 311 in the up-down direction and the front-rear direction. When the personal mobility 100 is loaded in the loading space 311, the steering handle 150 enters the inside of the main body 110, and then the personal mobility 100 enters the loading space 311. This loading method may increase loading efficiency and may stably protect the steering handle 150 of the personal mobility 100 and the like.

The main body 110 of the personal mobility loaded in the loading space 311 may be stably supported without falling down because opposite sides thereof are supported by the partition wall 312 or a side wall 313 of the loading rack 310. Also, the front wheel 120 and the rear wheel 130 of the personal mobility 100 loaded on an upper side in the loading space 311 are supported in a state of being partially accommodated in the wheel receiving grooves 117 and 118 of the lower personal mobility body 110, the upper personal mobility 100 may be stably loaded without being pushed in the front-rear direction.

As illustrated in FIGS. 7 and 8, the plurality of coupling bars 320 may have a long pipe shape. The coupling bars 320 may be installed to penetrate the coupling holes 119 that are formed in the main bodies 110 of the loaded plurality of personal mobilities 100, and support holes 315 that are formed on the partition walls 312 and the side walls 313 of the loading rack 310 to correspond to the coupling holes 119, in the lateral direction.

The coupling bars 320 may be easily mounted by a method in which the coupling bars 320 are inserted from a side of the loading rack 310 in a state in which one or more personal mobilities 100 are loaded inside the loading rack 310. The plurality of personal mobilities 100 inside the loading space 311 may be fixed so as not to be pushed in the front-rear direction and the up-down direction by the coupling bars 320.

The partition walls 312 and the opposite side walls 313 of the loading rack 310 may each include one or more support rails 316 protruding from sides thereof and extending long in the front-rear direction to support the plurality of personal mobilities 100 loaded in an upper region of the loading space 311. As illustrated in FIG. 8, the support rails 613 may stably support a lower portion of the main body 110 of the personal mobility 100.

The loading apparatus 300 as described above may be used in a state of being mounted on a transport truck for collection and relocation of the personal mobility 100 or may be used in a state of being placed in a storage place on the ground.

When the loading apparatus 300 is mounted on a transport truck, the user may load or unload the personal mobility 100 onto or from the loading rack 310 using a lifting device or the like installed in the transport truck. A worker who collects and relocates the personal mobility 100 may easily couple or uncouple the plurality of loaded personal mobilities 100 by mounting or removing the one or more coupling bars 320 to or from the side of the loading rack 310.

Figure 9:
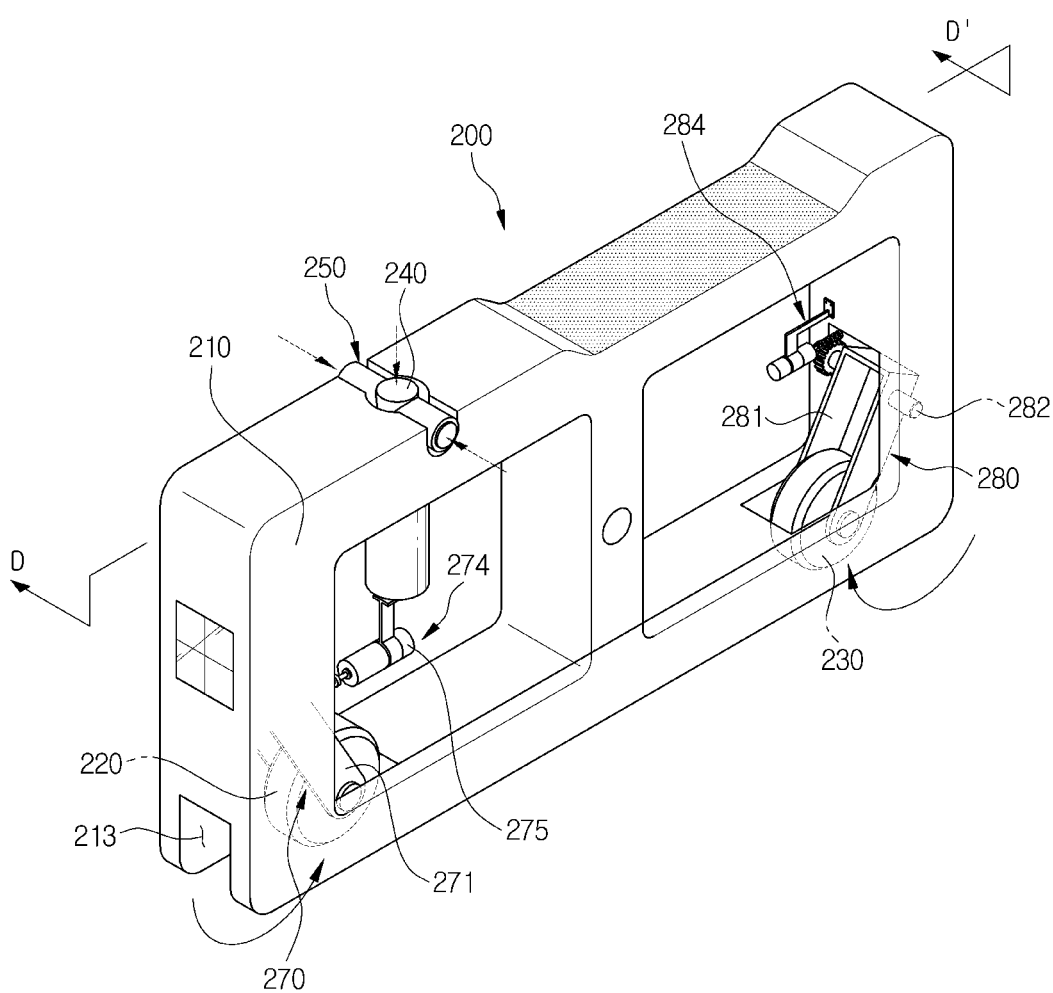
FIG. 9 is a perspective view of a personal mobility according to a second embodiment of the disclosure, illustrating a state in which a steering handle, a front wheel, and a rear wheel enter the inside of a main body.
Figure 10:
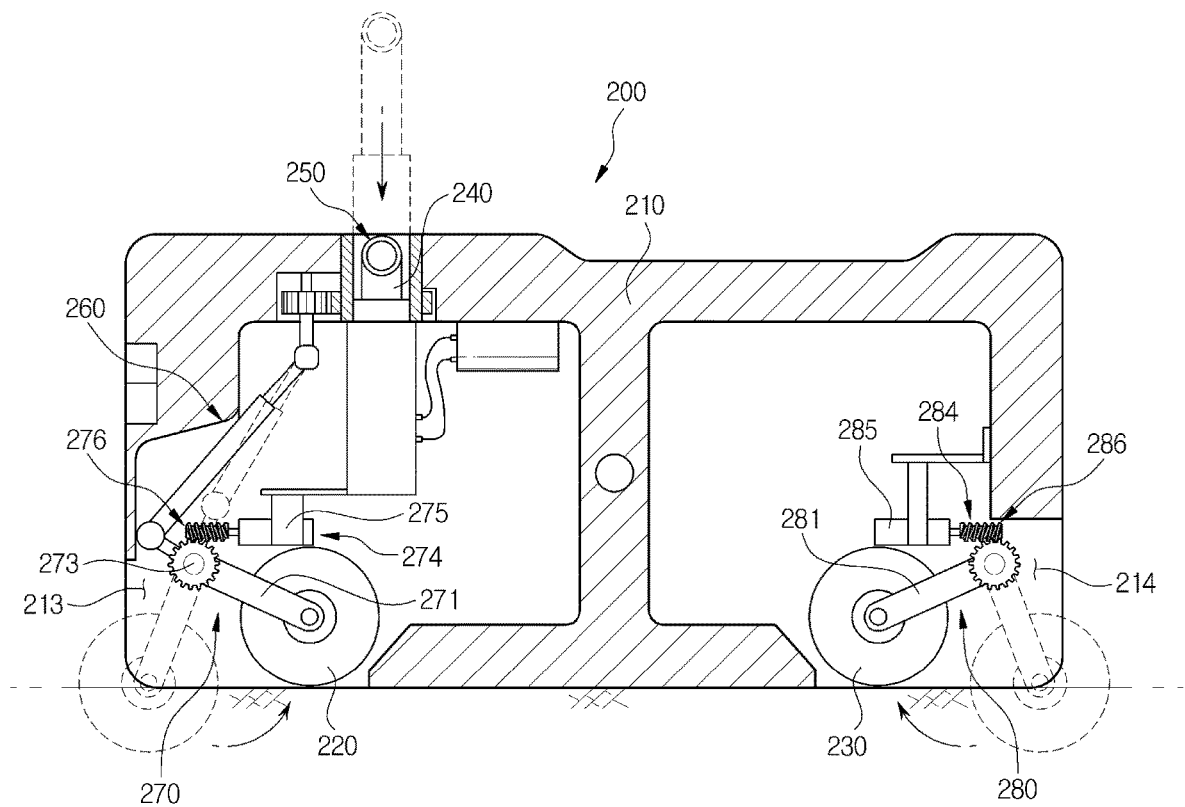
FIG. 10 is a cross-sectional view taken along line D-D' in FIG. 9.

FIGS. 9 to 12 illustrate a personal mobility 200 according to a second embodiment. As illustrated in FIGS. 9 and 10, the personal mobility 200 according to the second embodiment may be configured such that, when loaded and stored, not only a steering shaft 240 and a steering handle 250, but also a front wheel 220 and a rear wheel 230 enter the inside of a main body 210.

As illustrated in FIG. 10, the main body 210 includes a front wheel receiving portion 213 provided on a front lower edge and capable of completely accommodating the front wheel 220 therein, and a rear wheel receiving portion 214 provided on a rear lower edge and capable of completely accommodating the rear wheel 230 therein.

The personal mobility 200 according to the second embodiment may include a front wheel support device 270 installed in the front wheel receiving portion 213 to support the front wheel 220 and capable of moving the front wheel 220 to the inside of the front wheel receiving portion 213 or the outside of the main body 210, and a rear wheel support device 280 installed in the rear wheel receiving portion 214 to support the rear wheel 230 and capable of moving the rear wheel 230 to the inside of the rear wheel receiving portion 214 or the outside of the main body 210.

Figure 11:
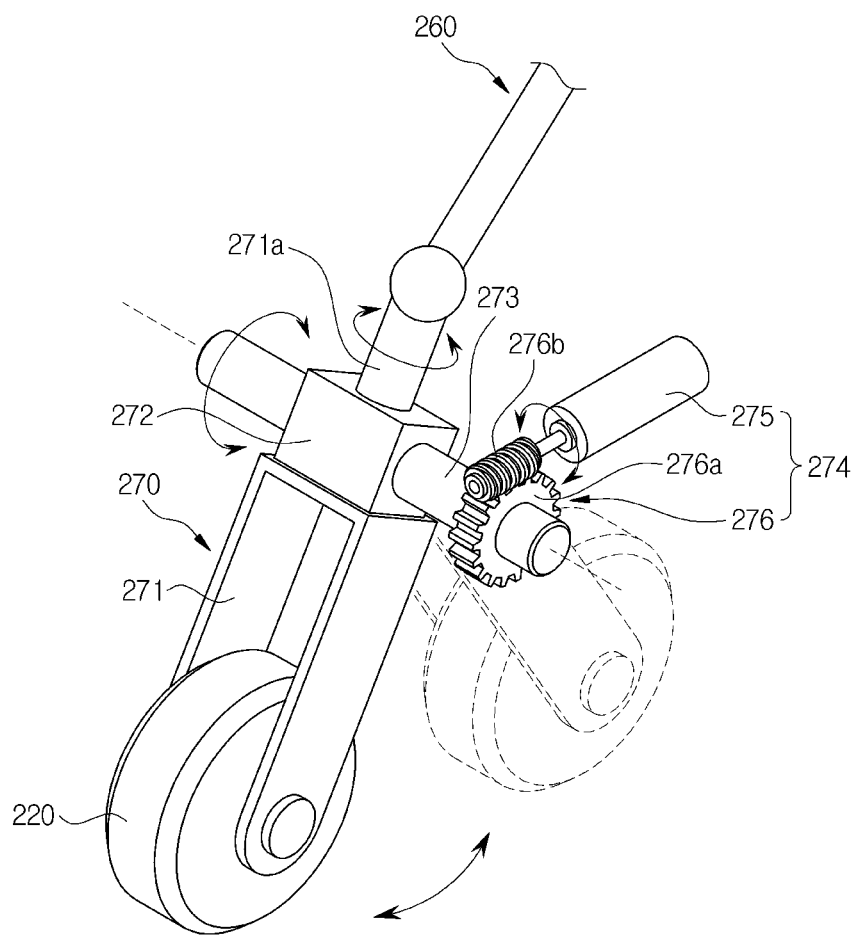
FIG. 11 is a perspective view of a front wheel support device for the personal mobility according to the second embodiment of the disclosure.

Referring to FIGS. 10 and 11, the front wheel support device 270 may include a front wheel support member 271, a shaft support member 272, a second support shaft 273, and a front transfer driving device 274.

The front wheel support member 271 is provided in a fork shape to support a shaft of the front wheel 220 and includes a first support shaft 271*a* connected to a power transmission device 260 of a steering device on an upper side thereof.

The shaft support member 272 rotatably supports the first support shaft 271*a* so that the front wheel support member 271 may rotate in a steering direction. The second support shaft 273 extends in a width direction of the main body 210 from opposite sides of the shaft support member 272 to be rotatably supported on the main body 210. Accordingly, the front wheel support member 271 may rotate about the first support shaft 271a for steering of the front wheel 220, or may rotate about the second support shaft 273 for the turning movement of the front wheel 220.

The front transfer driving device 274 may rotate the second support shaft 273 in the forward or backward direction to move the front wheel 220 to the outside of the main body 210 or the inside of the main body 210. As illustrated in FIG. 11, the front transfer driving device 274 includes a front transfer motor 275 fixed in the main body 210, and a worm gear assembly 276 to transmit the rotation of the front transfer motor 275 to the second support shaft 273. The worm gear assembly 276 may include a worm wheel 276a fixed to the second support shaft 273, and a worm 276b engaged with the worm wheel 276a and rotated by the front transfer motor 275.

Because the front transfer driving device 274 employs the worm gear assembly 276, power transmission in the backward direction may be limited. Therefore, when the operation of the front transfer motor 275 is stopped, a state in which the front wheel 220 is moved to the outside of the main body 210 or a state in which the front wheel 220 is moved to the inside of the main body 210 may be maintained.

Figure 12:
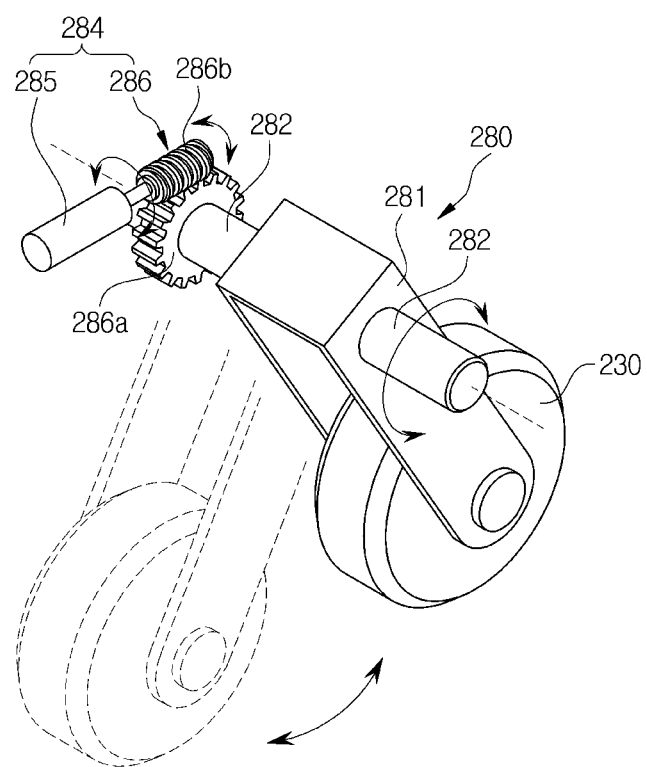
FIG. 12 is a perspective view of a rear wheel support device for the personal mobility according to the second embodiment of the disclosure.

Referring to FIGS. 10 and 12, the rear wheel support device 280 may include a rear wheel support member 281, a rear support shaft 282, and a rear transfer driving device 284.

The rear wheel support member 281 is provided in a fork shape to support a shaft of the rear wheel 230. The rear support shaft 282 extends from opposite sides of an upper portion of the rear wheel support member 281 in a width direction of the main body 210 to be rotatably supported on the main body 210. Accordingly, the rear wheel support member 281 may rotate about the rear support shaft 282 for the turning movement of the rear wheel 223.

The rear transfer driving device 284 may rotate the rear support shaft 282 in the forward or backward direction to move the rear wheel 230 to the outside of the main body 210 or the inside of the main body 210. As illustrated in FIG. 12, the rear transfer driving device 284 includes a rear transfer motor 285 fixed in the main body 210, and a worm gear assembly 286 to transmit the rotation of the rear transfer motor 285 to the rear support shaft 282. The worm gear assembly 286 may include a worm wheel 286a fixed to the rear support shaft 282, and a worm 286b engaged with the worm wheel 286a and rotated by the rear transfer motor 285.

Like the front transfer driving device 274, because the rear transfer driving device 284 employs the worm gear assembly 286, power transmission in the backward direction may be limited. Therefore, when the operation of the rear transfer motor 285 is stopped, a state in which the rear wheel 230 is moved to the outside of the main body 210 or a state in which the front wheel 220 is moved to the inside of the main body 210 may be maintained.

As illustrated in FIG. 10, because the personal mobility 200 of the second embodiment is configured such that not only the steering shaft 240 and the steering handle 250, but also the front wheel 220 and the rear wheel 230 may completely enter the inside of the main body 210, the personal mobility 200 may be transformed into an almost complete box shape (e.g., a rectangular cuboid) when loaded and stored.

Figure 13:
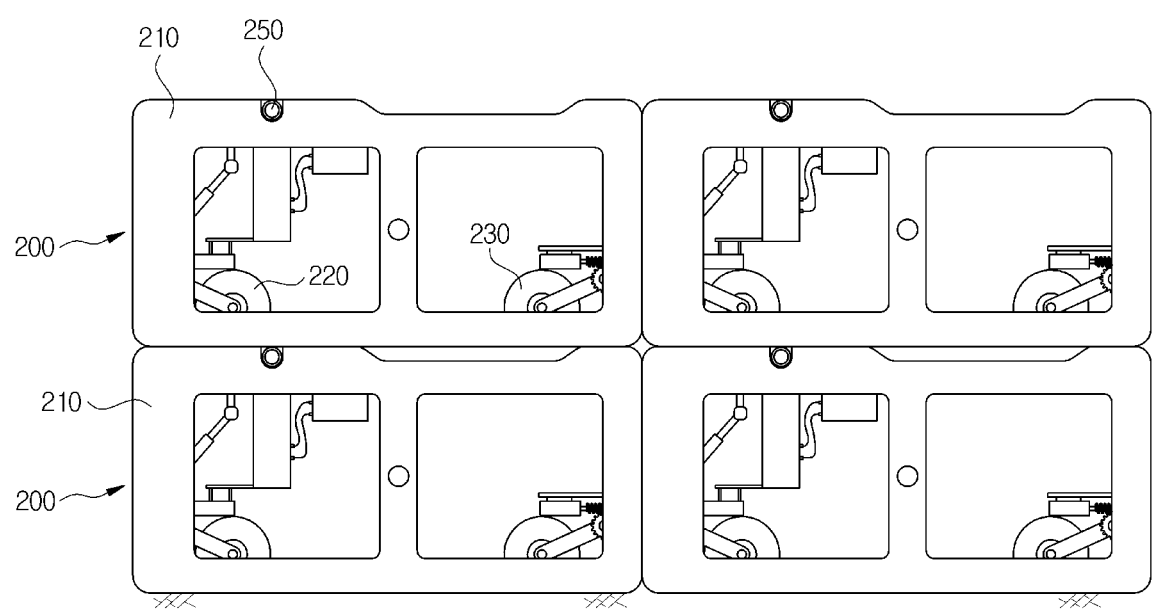
FIG. 13 is a side view illustrating a state in which the personal mobility according to the second embodiment of the disclosure is loaded.

The personal mobility 200 of the second embodiment may also be loaded using the loading apparatus 300 as illustrated in FIGS. 7 and 8. As illustrated in FIG. 13, when the plurality of personal mobilities 200 of the second embodiment is loaded, the steering handle 250, the front wheel 220 and the rear wheel 230 of each of the plurality of personal mobilities 200 enter the inside of the main body 210, and then the plurality of personal mobilities 200 may be continuously loaded in the up-down direction or the front-back direction into the loading rack 310 having the loading spaces 311 having a width corresponding to the width of the main body 210. After being loaded, the one or more coupling bars 320 may be mounted as in the first embodiment.

As illustrated in FIGS. 10 and 13, because the personal mobility 200 of the second embodiment is configured such that not only the steering shaft 240 and the steering handle 250, but also the front wheel 220 and the rear wheel 230 may completely enter the inside of the main body 210, when loaded in the loading spaces 311 in the up-down or front-rear direction, the adjacent main bodies 210 may be stacked in close contact with each other. Therefore, the personal mobility 200 of the second embodiment may further increase the loading efficiency compared to the personal mobility 100 of the first embodiment and may be loaded more stably, and after being loaded, the steering handle 250, the front wheel 220, the rear wheel 230, etc. may be protected more safely.

The second embodiment illustrates a method in which the front wheel support device 270 and the rear wheel support device 280 turn the front wheel 220 and the rear wheel 230 respectively to move to the inside and outside of the body 210, but the front wheel support device 270 and the rear wheel support device 280 are not limited thereto. The front wheel support device 270 and the rear wheel support device 280 may be provided in a method in which the front wheel 220 and the rear wheel 230 move to the inside and outside of the body 210 by sliding, respectively.

As is apparent from the above, a personal mobility according to an embodiment of the disclosure includes a main body having a box shape and is configured such that a steering handle enters the inside of the main body when loaded, so that transportation and loading are easy, loading efficiency can be increased, and safe storage can be secured.

Further, the personal mobility according to an embodiment of the disclosure is configured such that not only a steering shaft and the steering handle, but also front and rear wheels completely enter the inside of the main body, loading efficiency can be increased, safe loading can be secured, and the steering handle, the front wheel, the rear wheel, and the like can be safely protected after being loaded.

Further, a loading apparatus for the personal mobility according to an embodiment of the disclosure includes a loading rack having loading spaces corresponding to a width of the main body of the personal mobility, and coupling bars mounted to penetrate the loaded personal mobility and the loading rack in a lateral direction, a plurality of the personal mobilities transformed into a box shape when loaded can be stably loaded, and the plurality of loaded personal mobilities can be easily coupled within the loading rack.

What is claimed is:
1. A personal mobility device comprising:
a main body provided in a box shape, wherein the main body comprises one or more coupling holes penetrating in a direction of crossing a traveling direction, wherein coupling bars of a loading apparatus are configured to be mounted in the coupling holes;
a steering device comprising a steering handle configured to extend outwardly from the main body or to retract so as not to protrude from the main body; and a front wheel and a rear wheel installed on a front side and a rear side of the main body, respectively.

2. The personal mobility device according to claim 1, wherein the box shape of the main body has a height in an up-down direction smaller than a length in a front-rear direction and a width in a lateral direction smaller than the height in the up-down direction.

3. The personal mobility device according to claim 2, wherein the main body comprises:
 a front wheel receiving portion on a front lower edge, the front wheel receiving portion configured to accommodate a portion of the front wheel; and
 a rear wheel receiving portion on a rear lower edge, the rear wheel receiving portion configured to accommodate a portion of the rear wheel.

4. The personal mobility device according to claim 2, wherein the main body comprises wheel receiving grooves on a front upper side and a rear upper side, the wheel receiving grooves configured to support front and rear wheels, respectively, of a second personal mobility device loaded on an upper side of the main body.

5. The personal mobility device according to claim 1, wherein a width of a front end of the main body and a width of a rear end of the main body are substantially equal.

6. A personal mobility device comprising:
 a main body provided in a box shape;
 a steering device comprising a steering handle configured to extend outwardly from the main body or to retract so as not to protrude from the main body; and
 a front wheel and a rear wheel installed on a front side and a rear side of the main body, respectively;
 wherein the steering device comprises:
  a telescopic steering shaft installed on an upper portion of the main body, the telescopic steering shaft having an upper end connected to the steering handle and configured to be operated to extend upward from the main body or to retract into an inner region of the main body;
  a telescopic driving device in the main body and configured to extend and retract the steering shaft; and
  a power transmission device configured to transmit a rotation of the steering shaft to the front wheel.

7. The personal mobility device according to claim 6, wherein the main body comprises one or more coupling holes penetrating in a direction of crossing a traveling direction, wherein coupling bars of a loading apparatus are configured to be mounted in the coupling holes.

8. The personal mobility device according to claim 6, wherein the steering handle comprises:
 a handle bar fixed to an upper portion of the steering shaft and having a length corresponding to a width of the main body or smaller than the width of the main body;
 left and right handles on opposite sides of the handle bar, respectively, the left and right handles being configured to protrude from opposite ends of the handle bar in a longitudinal direction or to enter an inner region of the handle bar; and
 one or more handle driving devices in the handle bar, the handle driving devices being configured to operate the left and right handles.

9. A personal mobility device comprising:
 a main body provided in a box shape;
 a steering device comprising a steering handle configured to extend outwardly from the main body or to retract so as not to protrude from the main body; and
 a front wheel and a rear wheel installed on a front side and a rear side of the main body, respectively;
 wherein the main body comprises:
  a front wheel receiving portion provided on a front lower edge, the front wheel receiving portion being configured to accommodate the front wheel therein; and
  a rear wheel receiving portion provided on a rear lower edge, the rear wheel receiving portion being configured to accommodate the rear wheel therein.

10. The personal mobility device according to claim 9, further comprising:
 a front wheel support device in the front wheel receiving portion and configured to movably support the front wheel to an inside or an outside of the front wheel receiving portion; and
 a rear wheel support device in the rear wheel receiving portion and configured to movably support the rear wheel to an inside or an outside of the rear wheel receiving portion.

11. The personal mobility device according to claim 10, wherein the front wheel support device comprises:
 a front wheel support member configured to support a shaft of the front wheel and comprising a first support shaft connected to the steering device;
 a shaft support member configured to rotatably support the first support shaft;
 a second support shaft extending from opposite sides of the shaft support member in a width direction of the main body and configured to be rotatably supported on the main body; and
 a front transfer driving device configured to rotate the second support shaft in a forward or backward direction.

12. The personal mobility device according to claim 11, wherein the front transfer driving device comprises:
 a front transfer motor fixed to the main body; and
 a worm gear assembly configured to transmit a rotation of the front transfer motor to the second support shaft.

13. The personal mobility device according to claim 10, wherein the rear wheel support device comprises:
 a rear wheel support member configured to support a shaft of the rear wheel;
 a rear support shaft extending from opposite sides of the rear wheel support member in a width direction of the main body and configured to be rotatably supported on the main body; and
 a rear transfer driving device configured to rotate the rear support shaft in a forward or backward direction.

14. The personal mobility device according to claim 13, wherein the rear transfer driving device comprises:
 a rear transfer motor fixed to the main body; and
 a worm gear assembly configured to transmit a rotation of the rear transfer motor to the rear support shaft.

15. A loading apparatus for a plurality of personal mobility devices, each of the personal mobility devices including a main body provided in a box shape, a steering handle capable of being folded to enter an inner region of the main body, and a front wheel and a rear wheel respectively installed on a front side and a rear side of the main body, the loading apparatus comprising:
 a loading rack having a width corresponding to a width of the main body of the personal mobility devices and having a plurality of loading spaces capable of loading in series the plurality of the personal mobility devices in an up-down direction or a front-rear direction; and a plurality of coupling bars configured to penetrate the main bodies of the plurality of personal mobility devices loaded in the plurality of loading spaces and the loading rack in a lateral direction.

16. The loading apparatus according to claim 15, wherein the loading rack comprises a plurality of partition walls configured to partition an inner region of the loading rack into the plurality of loading spaces.

17. The loading apparatus according to claim 16, wherein the coupling bars are configured to be coupled to penetrate coupling holes formed in the main bodies of the plurality of personal mobility devices and support holes formed on the plurality of partition walls to correspond to the coupling holes.

18. The loading apparatus according to claim 16, wherein the plurality of partition walls comprises one or more support rails protruding from sides thereof and extending long in the front-rear direction, the support rails being configured to support the plurality of personal mobility devices loaded in upper regions of the plurality of loading spaces.

19. A loading method of a plurality of personal mobility devices, each of the personal mobility devices including a main body provided in a box shape, a steering handle capable of protruding from an exterior of the main body or entering an interior of the main body, and a front wheel and a rear wheel respectively installed on a front side and a rear side of the main body, the loading method comprising:
 for each of the personal mobility devices, entering the steering handle into the interior of the main body and then loading each of the personal mobility devices in a loading rack having a plurality of loading spaces, each loading space having a width corresponding to a width of the main body in an up-down direction or a front-rear direction; and
 installing one or more coupling bars to penetrate the main bodies of the personal mobility devices loaded in the plurality of loading spaces and the loading rack in a lateral direction.

20. A loading method of a plurality of personal mobility devices, each of the personal mobility devices including a main body provided in a box shape, a steering handle capable of protruding from an exterior of the main body or entering an interior of the main body, and a front wheel and a rear wheel respectively installed on a front side and a rear side of the main body, the loading method comprising:
 for each of the personal mobility devices, entering the steering handle into the interior of the main body and then loading each of the personal mobility devices in a loading rack having a plurality of loading spaces, each loading space having a width corresponding to a width of the main body in an up-down direction or a front-rear direction;
 wherein, when the personal mobility devices are loaded in the up-down direction, the front and rear wheels of one of the personal mobility devices located at an upper side are supported on wheel receiving grooves provided on an upper portion of the main body of one of the personal mobility devices located at a lower side, respectively.

21. A loading method of a plurality of personal mobilities, each of the personal mobilities including a main body provided in a box shape, a steering handle capable of protruding from an exterior of the main body or entering an interior of the main body, and a front wheel and a rear wheel respectively installed on a front side and a rear side of the main body and capable of protruding from the exterior of the main body or entering the interior of the main body, the loading method comprising:
 entering the steering handle and the front and rear wheels into the interior of the main body and then loading each of the personal mobilities in a loading rack having a plurality of loading spaces, each loading space having a width corresponding to a width of the main body in an up-down direction or a front-rear direction; and
 installing one or more coupling bars to penetrate the main bodies of the personal mobilities loaded in the plurality of loading spaces and the loading rack in a lateral direction.

* * * * *